US008923842B2

(12) United States Patent
Brend et al.

(10) Patent No.: US 8,923,842 B2
(45) Date of Patent: Dec. 30, 2014

(54) FEMTOCELL ARRANGEMENTS

(75) Inventors: Graham Brend, Bath (GB); Philip Sapiano, Corsham (GB); Nigel Bradley, Cricklade (GB); Tony Putman, Chippenham (GB)

(73) Assignee: Alcatel Lucent, Boulogne-Billancourt (FR)

(*) Notice: Subject to any disclaimer, the term of this patent is extended or adjusted under 35 U.S.C. 154(b) by 41 days.

(21) Appl. No.: 13/381,179

(22) PCT Filed: Jun. 24, 2010

(86) PCT No.: PCT/EP2010/003790
§ 371 (c)(1),
(2), (4) Date: Mar. 15, 2012

(87) PCT Pub. No.: WO2011/000495
PCT Pub. Date: Jan. 6, 2011

(65) Prior Publication Data
US 2012/0165005 A1 Jun. 28, 2012

(30) Foreign Application Priority Data

Jun. 30, 2009 (EP) .................................. 09290516

(51) Int. Cl.
*H04W 36/00* (2009.01)
*H04W 52/24* (2009.01)
*H04W 36/04* (2009.01)
*H04W 52/34* (2009.01)
*H04W 36/30* (2009.01)
*H04W 84/04* (2009.01)

(52) U.S. Cl.
CPC ............ *H04W 52/245* (2013.01); *H04W 36/04* (2013.01); *H04W 36/30* (2013.01); *H04W 52/243* (2013.01); *H04W 52/343* (2013.01); *H04W 84/045* (2013.01)
USPC ...................................... 455/422.1; 455/444

(58) Field of Classification Search
None
See application file for complete search history.

(56) References Cited

U.S. PATENT DOCUMENTS

2007/0097939 A1  5/2007 Nylander et al.
2007/0213067 A1* 9/2007 Li et al. .................. 455/444
(Continued)

FOREIGN PATENT DOCUMENTS

| JP | 8280057 A | 10/1996 |
|---|---|---|
| JP | 2005295003 A | 10/2005 |
| WO | WO 2008/057658 A2 | 5/2008 |
| WO | 20090048803 A | 4/2009 |
| WO | 2009068561 A2 | 6/2009 |

OTHER PUBLICATIONS

Chowdhury et al., "Handover Between Macrocell and Femtocell for UMTS Based Networks," Advanced Communication Technology, XP031446109, pp. 237-241, Feb. 15, 2009.

(Continued)

*Primary Examiner* — German J Viana Di Prisco
(74) *Attorney, Agent, or Firm* — Fay Sharpe LLP

(57) ABSTRACT

A femtocell arrangement comprises a plurality of femtocells Femto 1 to Femto 13 having coverage distributed over a region, such as, for example, an office. A border femtocell, Femto 3 or Femto 10, of said plurality has coverage at an entrance to the region and is arranged to operate at a higher transmit power level to provide a larger coverage area than that provided by neighboring femtocells. In addition, the border femtocell may be allocated a specific Primary Scrambling Code (PSC) to show its designation as a border femtocell. An approaching user equipment UE 1 or UE 2 tends to attach to the higher transmit power border femtocells. The Femto Gateway managing the connection is aware of the likelihood that an approaching UE will tend to attach to a border femtocell, and this is further confirmed by the use of a specific PSC. Hence, handover is expedited as the most suitable femtocells may be chosen as targets for handover.

20 Claims, 4 Drawing Sheets

(56) References Cited

U.S. PATENT DOCUMENTS

| | | | |
|---|---|---|---|
| 2008/0146226 A1* | 6/2008 | Claussen et al. | 455/435.1 |
| 2009/0097448 A1 | 4/2009 | Vasudevan et al. | |
| 2010/0197309 A1* | 8/2010 | Fang et al. | 455/436 |
| 2012/0140642 A1* | 6/2012 | Beck et al. | 370/252 |

OTHER PUBLICATIONS

International Search Report for PCT/EP2010/003790 dated Nov. 4, 2010.

R2-093068, Huawei, "ICHO PSC/PCI Avoidance and Access Rights Confirmation for Legacy Mobiles," 3GPP TSG-RAN WG2 Meeting #66, May 4-8, 2009, San Francisco, 3 pp.

English Bibliography for Japanese Patent App. Publication No. JP2005295003A, published Oct. 20, 2005, printed from Thomson Innovation on Jul. 30, 2013, 4 pp.

English Bibliography for Japanese Patent App. Publication No. JP8280057A, published Oct. 22, 1996, printed from Thomson Innovation on Jan. 16, 2014, 2 pp.

* cited by examiner

Traditional UMTS architecture  Home BS architecture

BS—Base station
IP—Internet Protocol
GGSN—Gateway GPRS support node
GPRS—General packet radio service
MSC—Mobile switching center PSTN—Public switched telephone network
RNC—Radio network controller
SGSN—Serving GPRS support node
UMTS—Universal Mobile Telecommunications System

FEMTOCELL ARRANGEMENTS

FIELD OF THE INVENTION

The present invention relates to femtocell arrangements.

BACKGROUND

Femtocells (also referred to as "Femtos" in this specification) are low power, low cost, generally user-deployed base stations that are able to provide exceptional cellular service in residential or enterprise environments, with a typical coverage range of tens of meters. They have extensive auto-configuration and self-optimization capabilities to enable a simple 'plug and play' deployment, and are designed to automatically integrate themselves in an existing macrocellular network. Femtocells typically use the customer's broadband internet connection (e.g. Digital Subscriber Line (DSL), cable, etc.) as backhaul.

A typical femtocell architecture is shown in FIG. 1, where the 'Home cell' shown on the right hand side is a femtocell and is connected to a Home cell, or Femtocell, Controller/Gateway. In the particular architecture illustrated, elements on the left hand side of the figure are included in a Universal Mobile Telecommunications System (UMTS) macrocellular network, and include a base station known as a NodeB, a Radio Network Controller (RNC), Mobile Switching Centre (MSC), Serving GPRS Support Node (SGSN), and Gateway GPRS Support Node (GGSN). Usually there is a connection to a public switched telephone network (PSTN).

In UMTS femtocell arrangements, the number of primary scrambling codes (PSC) which may be allocated to a Femto is limited. The number that can be allocated is typically between 6 and 16. The selection of a primary scrambling code is typically auto-configured by the femtocells themselves based on measurements of other primary scrambling codes used in their vicinity. Therefore, in typical femtocell deployments, these scrambling codes will need to be heavily re-used. With a high level of PSC re-use, it is likely that a user equipment (UE) served by a macro cell, or a femtocell, that measures femtocells, will report the same PSC from a number of different cells. As currently defined in 3rd Generation Partnership Project (3GPP) standards, a UE does not provide the Cell ID in its UE measurement report. Therefore, it is difficult for the target network to use measurements supplied by the UE to automatically determine the actual target cell when performing either macro to Femto, or Femto to Femto Handover procedures.

When handling an incoming handover request from a macro cell, the Home Cell Gateway must be able to determine to which femtocell the UE is handing over. Efficient determination and subsequent reporting of the target cell for a handover procedure is an important requirement in maintaining a high quality of service to the UEs, since any interruption to an on-going session on the UE needs to be minimised. However existing 3GPP standard messages do not provide a mechanism for the source cell to uniquely identify the target cell, as the UE will not report the Cell ID of the target cell in measurement reports to the source cell. The UE is able to report the PSC of the target cell. However, when PSCs are re-used, the Gateway cannot rely on the reported value of the target cell PSC to uniquely identify it. Similarly for Femto to Femto Handovers, the source femtocell also must be able to determine the target femtocell for the handover to complete effectively, but again, the target cell may not be uniquely identified where there is a high level of PSC re-use.

Where the Gateway, or the source Femto, is not able to uniquely determine the target femtocell from the information provided by the UE in the source cell, it makes it difficult for the Gateway or source Femto to decide to which femtocell the Handover Request should be forwarded. This is especially important when considering a typical Enterprise/Office building which is likely to have many femtocells deployed.

One possible approach is for the Femto Gateway to make a guess about the correct target femtocell using the limited information provided as part of the handover request. This solution is likely to lead to an increase in the duration of the handover procedure, which may in turn impact the end user's on-going call, for example, leading to packet loss or even call drop.

Another possible approach is to prepare handover on all Femtos with the same PSC. However it will be appreciated that such an approach is extremely wasteful of resources and may soon become unmanageable as the number of deployed femto base stations and user equipment increases.

Enterprise users tend to pay a premium to an operator in return for the provision of a higher quality of service compared to standard users. Hence any degradation to that service is potentially significant as it can negatively impact the enterprise user's perception of the value they are receiving from paying for that premium service.

BRIEF SUMMARY

According to the invention, a femtocell arrangement comprises a plurality of femtocells deployed over a region. A border femtocell at an entrance to the region is configured to operate at a higher transmit power level than neighboring femtocells to provide a larger area coverage than that provided by neighboring femtocells. By operating border femtocells at a higher transmit power than other femtocells in a building, for example, this tends to "attract" UEs as they roam towards the building. This assists with the UEs attaching, and hence attempting to handover, to the border femto cells, rather than to any of the other femtocells that may be installed in the building. As the Femto Gateway is aware that any attachment is likely to be to a border Femto, it facilitates handover by aiding the identification of the target femtocell. The region over which the plurality of femtocells is deployed may be, for example, an office, a building, an outdoor area, or partially outdoors and partially indoors.

In one embodiment, the border femtocell has an assigned primary scrambling code (PSC) that identifies it as a border femtocell. The special PSC assists the Femto Gateway to make a swift identification as to which femtocell a UE is handing over to, as the number of entrances and hence number of "border" femto cells is likely to be a small number in comparison to the number of other femtocells deployed in such an environment. This has the advantage of minimising the delay in the Femto network when handling an incoming handover request, hence reducing the risk of impacting the quality of service to the end user. The special PSC may be assigned to a border Femto by the femto management system, based on knowledge of where it is deployed, for example, at the entrance to a building. This contrasts with the approach described previously in which PSCs are autoconfigured and not specially assigned to a specific Femto or specific Femtos.

In one embodiment, the border femtocell has different access control requirements to non-border femtocells. Such a scheme may be useful when considering a typical company office, having femtocells deployed throughout and a border Femto at its entrance. Visitors to a company are not permitted to connect to most of femtocells in the building, which are reserved for internal users only, but are still provided a connection via the border femtocell with wider access permissions.

The invention may be applied to a deployment of femtocells using procedures and information which are compatible with 3GPP R99 compliant UEs and hence does not require a standards change from that currently proposed.

BRIEF DESCRIPTION OF THE DRAWINGS

Some embodiments of the present invention will now be described by way of example only, and with reference to the accompanying drawings, in which.

DETAILED DESCRIPTION

Figure 1:
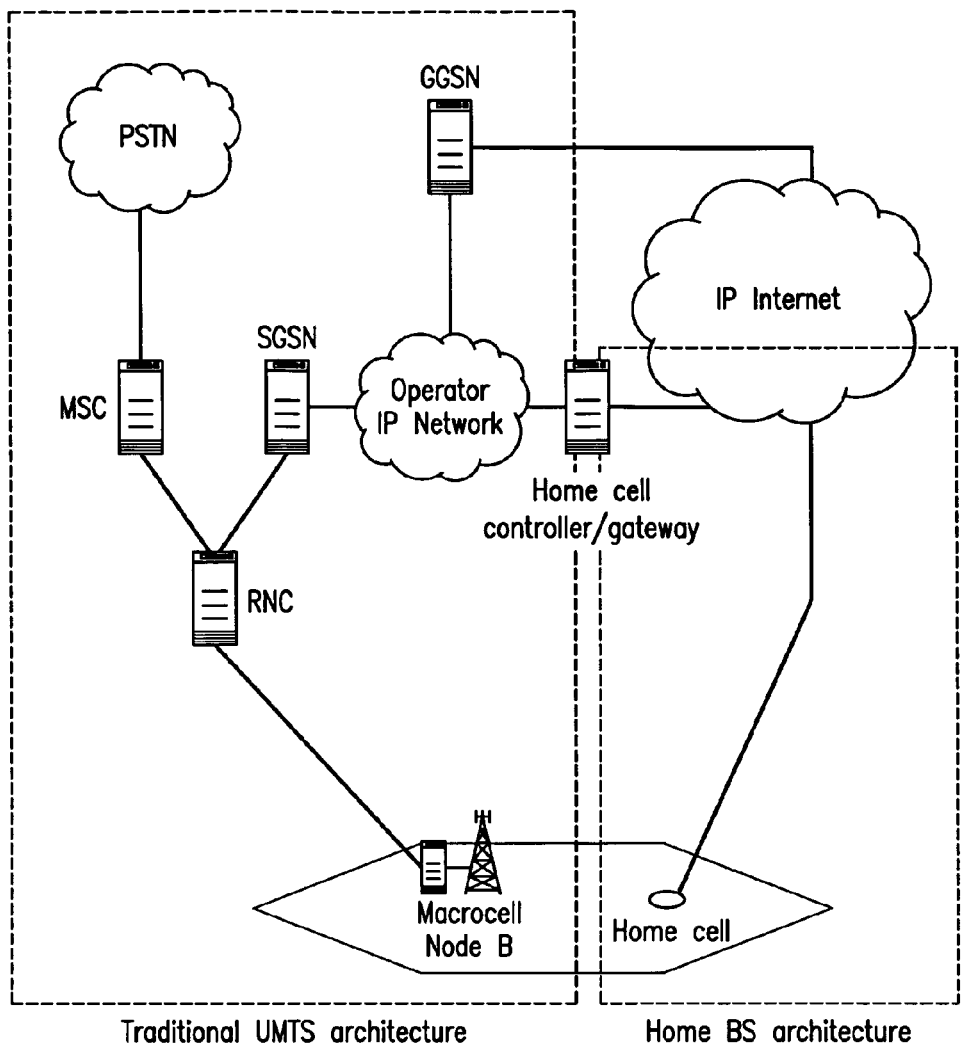
FIG. 1 schematically illustrates a typical femtocell base station architecture.
Figure 2:
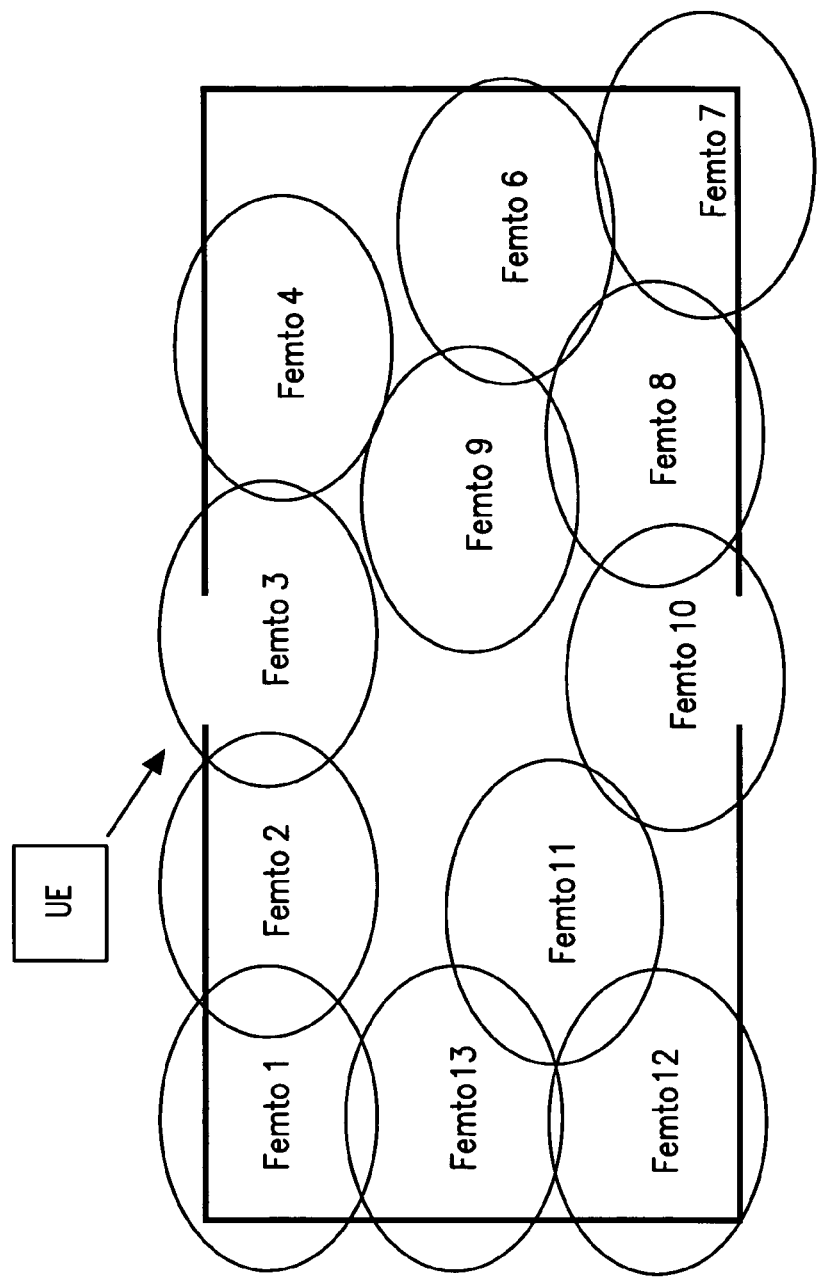
FIG. 2 schematically illustrates for explanatory purposes an arrangement not in accordance with the invention.

With reference to FIG. 2, which is an illustrative arrangement not in accordance with the invention and provided for the purposes of understanding, an office building has a plurality of femtocells, Femto 1 to Femto 13, deployed within it. Those Femtos located at the edge of the office radiate outside it. Hence, when a UE approaches the entrance to the office, as shown, it may attempt to attach to any femtocell that meets its handover criteria. For example, the UE 2 may equally attempt to attach to Femto 1, 2, or 3 as it approaches the entrance to the office. Depending on the number of PSCs re-used within the deployment, the Femto Gateway may not be able to make a unique identification of the handover target cell from the information it receives from the UE. Thus, handover may be delayed and adversely affect the operation of the UE.

Figure 3:
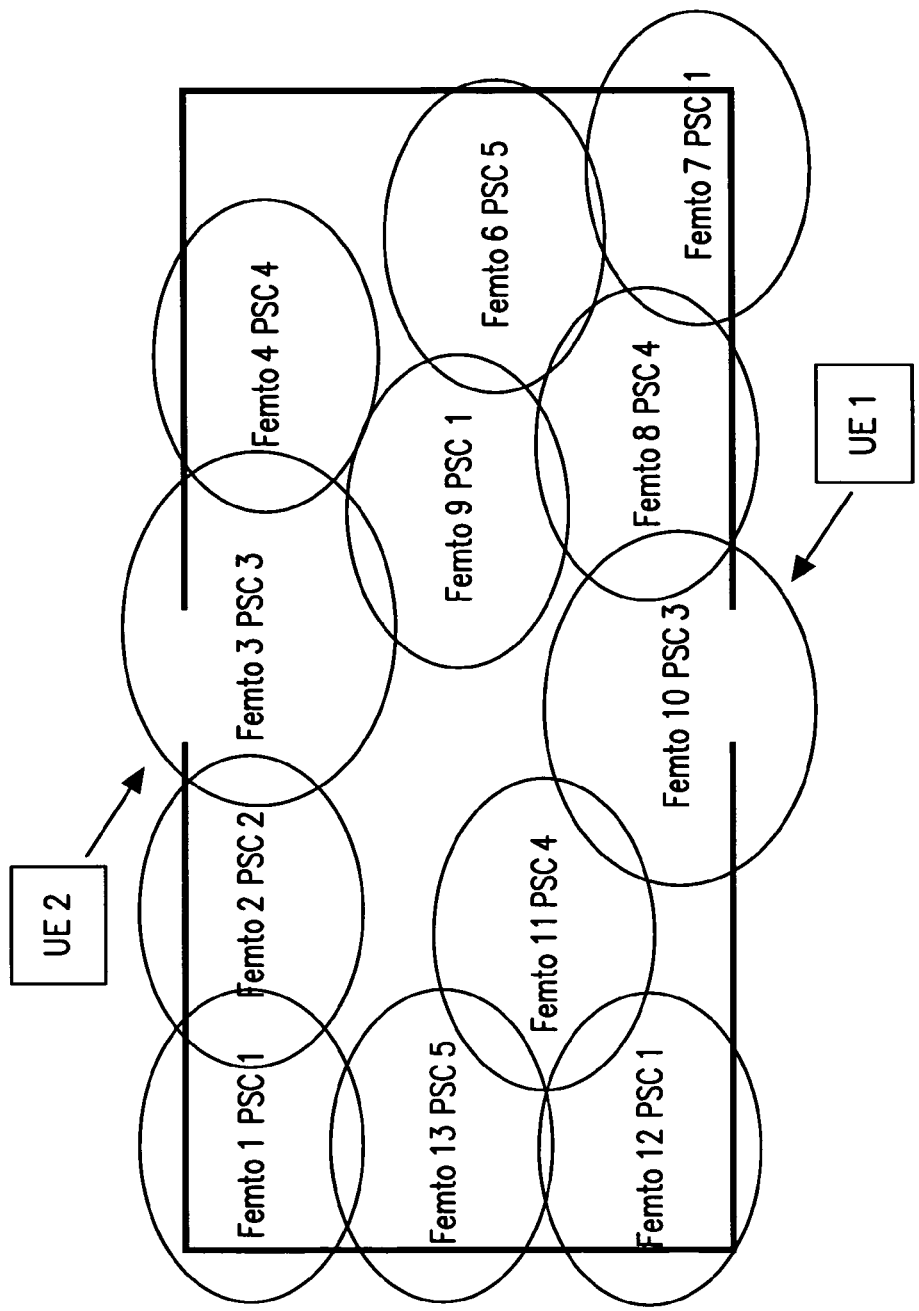
FIG. 3 schematically illustrates a femtocell arrangement in accordance with the invention.

With reference to FIG. 3, in an arrangement in accordance with the invention, a plurality of Femtos 1 to 13 is deployed in an office or other space, such as, for example, a university campus. There are two entrances to the space, shown at the top and bottom boundaries. The Femto 3 having a coverage area that encompasses the top entrance, is arranged to be operated at a higher transmit power than adjacent Femtos 1, 2 and 4, such that its coverage extends more widely. Femto 3 constitutes a border Femto and is allocated a specific PSC, which in this embodiment is PSC #3, to denote its status. At the lower entrance, Femto 10 is similarly arranged to have a wider coverage area than others adjacent to it and is also allocated the same PSC #3 as Femto 3 to denote that it is a border Femto. The PSC #3 is not re-used elsewhere within the office.

In FIG. 3, the UE 1 is about to enter the office at the bottom entrance and UE 2 at the top. As the UEs 1 and 2 approach the building, they attempt to attach to the border femtocells 10 and 3 respectively in preference to the other deployed cells because border femtocells 10 and 3 have wider coverage than their neighbors. For example, UE 1 will attach to femtocell 10 in preference to femtocell 8 or femtocell 7. This therefore assists the Femto Gateway in identifying which femtocell a UE is attempting to handover to when it receives an incoming Handover Request, since it will most likely be one of the border Femto cells deployed at the entrances to the office or other space. The use of a special PSC then reduces the number of femtocells that the Gateway would consider as the handover target, for example the information provided by UE 1 in its measurement report will include the PSC of the target femtocell. In this example this should be femtocell 10. Since only the border Femto cells 10 and 3 have the same PSC, the Gateway quickly reduces the number of candidate handover target cells to these two. It then forwards the handover request to both these cells and subsequently the UE will attach to only one. Alternatively, the Gateway may use additional information to make a decision on the most likely border cell and initially forwards the handover request to that candidate.

Figure 4:
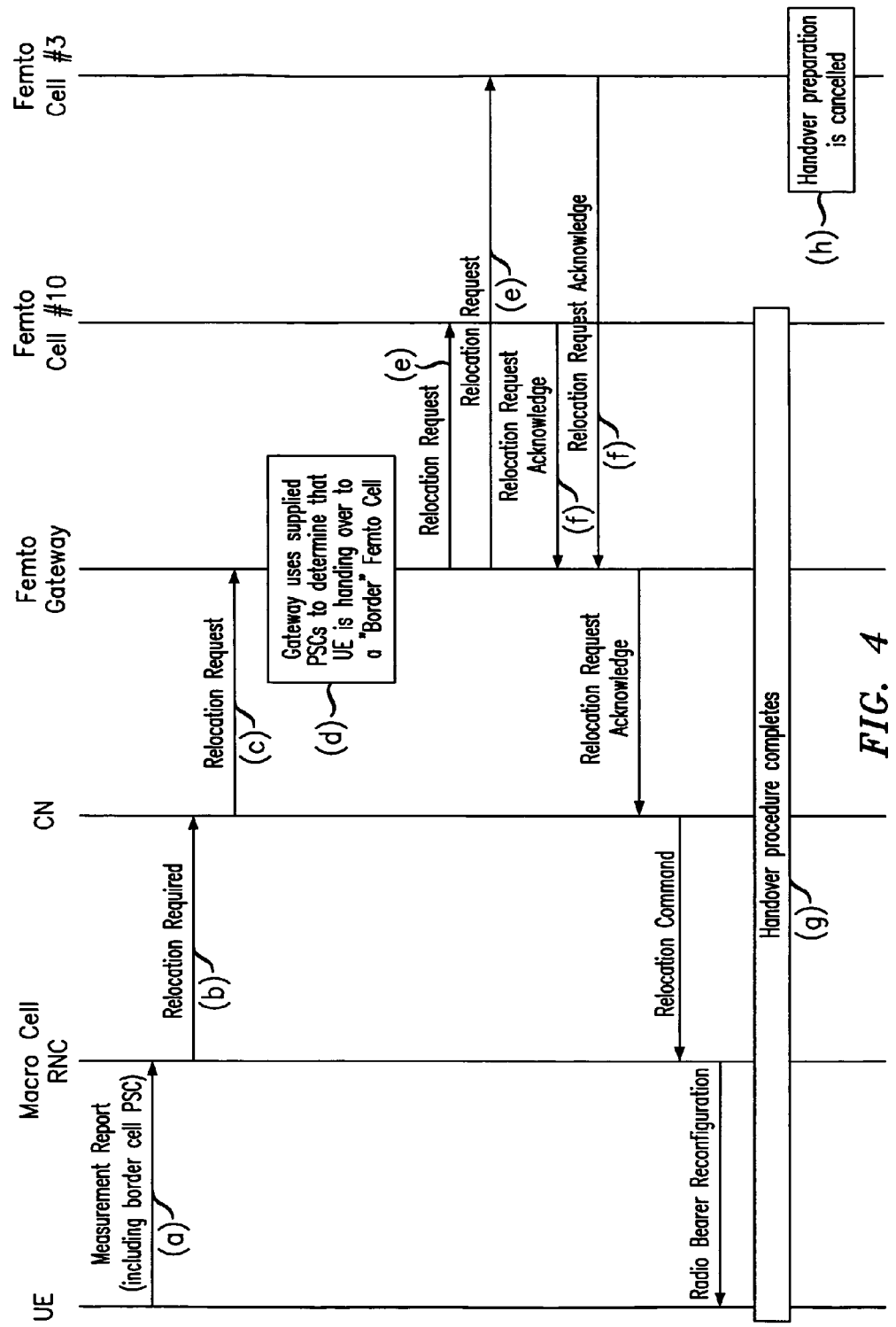
FIG. 4 schematically illustrates messaging associated with the operation of the arrangement shown in FIG. 3.

FIG. 4 provides an example of the sequence where the Gateway forwards a request to both border cells, Femtos 3 and 10, of the arrangement shown in FIG. 3.

As UE 1 roams towards the building, it sends a measurement report to the Macro Cell RNC (step (a)), indicating that the new cell (in this case Femto 10) is provides a much better quality signal than the existing macro cell. UE1 is "attracted" to Femtocell 10 in preference to other deployed femto cells, since it is transmitting at a higher power.

(b) The macro cell RNC sends a Relocation Required message to the Core Network (CN).

(c) Core Network sends corresponding Relocation Request message to the Femto Gateway, including the PSC of the target Cell (PSC 3).

(d) The Gateway uses the provided measurement information to determine that UE 1 is attempting to handover to one of the border Femto Cells.

(e) Gateway forwards the Relocation Request to Femto 10 and Femto 3.

(f) Femto Cell 10 and Femto 3 both respond, followed by acknowledgement and Relocation command back to the macro cell RNC.

(g) Subsequently, UE 1 performs a Handover to Femtocell 10 and prepared resources in Femto 3 are cancelled (h).

In a deployment such as that illustrated in FIG. 3, the majority of femtocells may only be accessible to UEs that are associated with the company that is based in that office. Therefore, whenever a visitor visits the office it is likely that their UE will not be allowed to access the femtocells deployed there. This can have negative impacts on the "visiting" UE, as it may attempt to handover to Femtos that it is not allowed to access, leading to a degradation in service and potential call drops. A company can designate the border Femtocells Femto 3 and 10 at the entrances to the building with a different access control requirement from that of other deployed femtocells. Hence "visiting" UEs may be allowed access to the border cells which cover areas within the building most frequently used by visitors. This permits them continuity of service, but also allows the hosting company to maintain restricted access to the other femtocells providing coverage within their office.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A femtocell arrangement comprising
a plurality of femtocells deployed over a region including a first border femtocell deployed at a first entrance to the region, the first border femtocell configured to operate at a higher transmit power level than non-border femtocells of the plurality of femtocells;
wherein the higher transmit power level provides a larger area coverage for the first border femtocell than coverage areas provided by non-border femtocells;

wherein the first border femtocell is assigned a primary scrambling code (PSC) that is also assigned to other border femtocells of the plurality of femtocells and not assigned to the non-border femtocells of the plurality of femtocells.

2. The arrangement as claimed in claim 1 wherein the PSC assigned to the first border femtocell is assigned to the other border femtocells deployed at entrances to the region to distinguish the border femtocells from the non-border femtocells.

3. The arrangement as claimed in claim 1 wherein the first border femtocell has different access control requirements than the non-border femtocells.

4. The arrangement as claimed in claim 1, wherein the region includes a plurality of entrances, the plurality of femtocells including a plurality of border femtocells correspondingly associated with the plurality of entrances such that each entrance is within a coverage area of the corresponding border femtocell, each border femtocell arranged to operate at the higher transmit power level than the non-border femtocells.

5. The arrangement as claimed in claim 4 wherein each of the border femtocells has the same PSC.

6. The arrangement as claimed in claim 1 wherein the region is an office building.

7. The arrangement as claimed in claim 1 wherein, during handover of a user equipment (UE) from a macro cell to the first border femtocell of the plurality of femtocells, a handover request from a femto gateway is received by the first border femtocell in preference to being received by the non-border femtocells, wherein the handover request includes the PSC assigned to the first border femtocell.

8. The arrangement as claimed in claim 3, wherein the access control requirements for the plurality of femtocells are configured such that access to the non-border femtocells is restricted for unauthorized user equipment (UE) and access to the first border femtocell is not restricted.

9. The arrangement as claimed in claim 1, the plurality of femtocells further comprising:
a second border femtocell deployed at a second entrance to the region, the second border femtocell configured to operate at the higher transmit power level than the non-border femtocells;
wherein the second border femtocell is assigned the same PSC as the first border femtocell.

10. A femtocell network, comprising:
a plurality of femtocell base stations deployed over a region, the plurality of femtocell base stations including:
at least one border femtocell base station; and
at least one non-border femtocell base station;
wherein each of the at least one border femtocell base station is deployed and configured to form a femtocell coverage area in which there is a corresponding entrance to the region;
wherein each of the at least one border femtocell base station is assigned a pre-selected primary scrambling code (PSC) that is also assigned to other border femtocell base stations deployed over the region and not assigned to the at least one non-border femtocell base station and other non-border femtocell base stations deployed over the region.

11. The femtocell network as claimed in claim 10, further comprising:
a femto gateway configured to control the plurality of femtocell base stations and to communicate with the macro cellular network.

12. The femtocell network as claimed in claim 10 wherein each of the at least one border femtocell base station is configured to operate at a higher transmit power level than the at least one non-border femtocell base stations.

13. The femtocell network as claimed in claim 10 wherein the same pre-selected PSC is assigned to each of the at least one border femtocell base station.

14. The femtocell network as claimed in claim 10 wherein the region includes at least one of a residential environment, an enterprise environment, a building, an outdoor area, and a university campus.

15. The femtocell network as claimed in claim 14 wherein the plurality of femtocells are configured such that access to each of the at least one non-border femtocell base station is restricted for unauthorized user equipment (UE) and access to each of the at least one border femtocell base station is not restricted.

16. A method for user equipment (UE) handover from a macro cellular network to a femtocell network, comprising:
receiving a relocation request message associated with a user equipment (UE) from a macro cellular network at a femtocell gateway configured to control a plurality of femtocell base stations deployed over a region;
wherein the plurality of femtocell base stations include at least first and second border femtocell base stations and at least one non-border femtocell base station;
wherein each border femtocell base station is deployed and configured to form a femtocell coverage area within which there is an entrance to the region;
wherein the relocation request message was sent to the femtocell gateway in response to the UE moving toward a coverage area served by a target femtocell base station controlled by the femtocell gateway;
wherein one of the at least first and second border femtocell base stations is the target femtocell base station;
wherein each of the at least first and second border femtocell base stations are assigned a pre-selected primary scrambling code (PSC) that is not assigned to the at least one non-border femtocell base station, the same pre-selected PSC being assigned to each of the first and second border femtocell base stations, and the relocation request message including the pre-selected PSC for the target femtocell base station.

17. The method as claimed in claim 16, further comprising:
forwarding the relocation request message from the femtocell gateway to the at least first and second border femtocell base stations;
receiving relocation request acknowledgement from one or more border femtocell base stations at the femtocell gateway; and
sending a relocation request acknowledgement from the femtocell gateway to the macro cellular network.

18. The method as claimed in claim 17 wherein the UE is handed over to the one of the at least first and second border femtocell base stations corresponding to the target femtocell base station.

19. The method as claimed in claim 18 wherein prepared resources for the handover at the at least first and second border femtocell base stations, except for the one of the at least first and second border femtocell base stations corresponding to the target femtocell base station, are cancelled.

20. The method as claimed in claim 18 wherein the UE is handed over from a macro cell base station of the macro cellular network to the target femtocell base station.

* * * * *